United States Patent
Patel et al.

(10) Patent No.: US 10,742,411 B2
(45) Date of Patent: Aug. 11, 2020

(54) GENERATING AND MANAGING DECENTRALIZED IDENTIFIERS

(71) Applicant: Microsoft Technology Licensing, LLC, Redmond, WA (US)

(72) Inventors: Ankur Patel, Sammamish, WA (US); Daniel James Buchner, Los Gatos, CA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 136 days.

(21) Appl. No.: 15/994,893

(22) Filed: May 31, 2018

(65) Prior Publication Data
US 2019/0230092 A1 Jul. 25, 2019

Related U.S. Application Data

(60) Provisional application No. 62/620,300, filed on Jan. 22, 2018, provisional application No. 62/626,564, filed on Feb. 5, 2018.

(51) Int. Cl.
*H04L 9/08* (2006.01)
*G06F 21/45* (2013.01)
(Continued)

(52) U.S. Cl.
CPC ...... *H04L 9/0894* (2013.01); *G06F 16/24578* (2019.01); *G06F 16/907* (2019.01);
(Continued)

(58) Field of Classification Search
CPC ..... H04L 9/0894; H04L 9/0637; H04L 9/083; H04L 9/14; G06F 16/907; G06F 16/9014;
(Continued)

(56) References Cited

U.S. PATENT DOCUMENTS

| 7,552,469 B2 | 6/2009 | Diffie et al. |
| 7,761,425 B1 | 7/2010 | Erickson et al. |

(Continued)

FOREIGN PATENT DOCUMENTS

| CN | 107480986 A | 12/2017 |
| EP | 0534420 A2 | 3/1993 |

(Continued)

OTHER PUBLICATIONS

Tang et al. Efficient Multi-Party Digital Signature using Adaptive Secret Sharing for Low-Power Devices in Wireless Networks, Feb. 2009, IEEE Transactions on Wireless Communications, vol. 8, No. 2, pp. 882-889 (Year: 2009).*

(Continued)

*Primary Examiner* — Kenneth W Chang
(74) *Attorney, Agent, or Firm* — Workman Nydegger

(57) ABSTRACT

The generation and management of decentralized identifiers of an entity. A decentralized identifier of a particular entity is recorded. Then, upon determining that the particular entity is granting a permission to another entity, the permission is signed based on the recorded decentralized identifier. As one example, the permission may be signed by a private key of the decentralized identifier. The permission may be verified upon request by authenticating the signed permission being associated with the recorded decentralized identifier; and authorizing the other entity to act upon the data depending on the authentication. As an example only, the authentication may occur using a public key associated with the recorded decentralized identifier.

19 Claims, 11 Drawing Sheets

(51) Int. Cl.
| | |
|---|---|
| *G06F 21/33* | (2013.01) |
| *G06F 16/901* | (2019.01) |
| *H04L 9/32* | (2006.01) |
| *G06F 16/907* | (2019.01) |
| *G06F 16/2457* | (2019.01) |
| *H04L 29/06* | (2006.01) |
| *G06Q 20/36* | (2012.01) |
| *G06Q 20/38* | (2012.01) |
| *H04L 9/06* | (2006.01) |
| *H04L 9/14* | (2006.01) |
| *H04L 9/30* | (2006.01) |
| *G06F 21/62* | (2013.01) |

(52) U.S. Cl.
CPC .......... *G06F 16/9014* (2019.01); *G06F 21/33* (2013.01); *G06F 21/45* (2013.01); *G06F 21/6218* (2013.01); *G06Q 20/3674* (2013.01); *G06Q 20/3821* (2013.01); *G06Q 20/3829* (2013.01); *H04L 9/0637* (2013.01); *H04L 9/083* (2013.01); *H04L 9/0869* (2013.01); *H04L 9/0891* (2013.01); *H04L 9/14* (2013.01); *H04L 9/30* (2013.01); *H04L 9/321* (2013.01); *H04L 9/3236* (2013.01); *H04L 9/3239* (2013.01); *H04L 9/3247* (2013.01); *H04L 63/08* (2013.01); *H04L 63/102* (2013.01); *H04L 63/20* (2013.01); *G06F 2221/2131* (2013.01); *G06F 2221/2141* (2013.01); *H04L 2209/38* (2013.01)

(58) Field of Classification Search
CPC .... G06F 16/24578; G06F 21/33; G06F 21/45; G06F 21/6218; G06Q 20/3674
See application file for complete search history.

(56) References Cited

U.S. PATENT DOCUMENTS

| | | | |
|---|---|---|---|
| 7,827,147 | B1 | 11/2010 | D'Hoye et al. |
| 8,245,271 | B2 | 8/2012 | Chan et al. |
| 8,566,952 | B1* | 10/2013 | Michaels ................ G06F 21/32 726/27 |
| 8,769,271 | B1 | 7/2014 | Osmond et al. |
| 8,931,054 | B2 | 1/2015 | Huynh et al. |
| 9,251,114 | B1 | 2/2016 | Ancin et al. |
| 9,424,400 | B1 | 8/2016 | Blankenbeckler et al. |
| 9,992,028 | B2 | 6/2018 | Androulaki et al. |
| 2002/0156726 | A1* | 10/2002 | Kleckner ................ G06Q 20/02 705/39 |
| 2003/0070072 | A1* | 4/2003 | Nassiri .................. H04L 9/3263 713/168 |
| 2007/0245149 | A1 | 10/2007 | Lin |
| 2007/0252001 | A1* | 11/2007 | Kail .................... G07C 9/00087 235/380 |
| 2009/0158041 | A1* | 6/2009 | Kang .................... H04L 63/104 713/171 |
| 2009/0300723 | A1* | 12/2009 | Nemoy ............... G06F 21/6254 726/4 |
| 2009/0300742 | A1 | 12/2009 | Ahn |
| 2010/0145997 | A1* | 6/2010 | Zur ..................... G06F 21/6218 707/783 |
| 2010/0199098 | A1* | 8/2010 | King .................... G06F 21/6254 713/182 |
| 2015/0172286 | A1* | 6/2015 | Tomlinson .......... H04L 63/0861 726/7 |
| 2016/0275309 | A1 | 9/2016 | Austin et al. |
| 2017/0155515 | A1 | 6/2017 | Androulaki et al. |
| 2017/0180128 | A1 | 6/2017 | Lu |
| 2017/0222814 | A1 | 8/2017 | Oberhauser et al. |
| 2017/0317833 | A1* | 11/2017 | Smith ................. G06Q 20/3276 |
| 2017/0317834 | A1 | 11/2017 | Smith et al. |
| 2019/0228406 | A1 | 7/2019 | Patel et al. |
| 2019/0229909 | A1 | 7/2019 | Patel et al. |
| 2019/0229914 | A1 | 7/2019 | Patel et al. |
| 2019/0230073 | A1 | 7/2019 | Patel et al. |

FOREIGN PATENT DOCUMENTS

| | | |
|---|---|---|
| WO | 2010019916 A1 | 2/2010 |
| WO | 2017145049 A1 | 8/2017 |

OTHER PUBLICATIONS

"International Search Report and Written Opinion Issued in PCT Application No. PCT/US19/013558", dated Apr. 9, 2019, 12 Pages (MS# 403731-WO-PCT).

"International Search Report and Written Opinion Issued in PCT Application No. PCT/US19/013559", dated Apr. 8, 2019, 11 Pages (MS# 404643-WO-PCT).

"International Search Report and Written Opinion Issued in PCT Application No. PCT/US19/013560", dated Apr. 8, 2019, 11 Pages. (MS# 404645-WO-PCT).

"International Search Report and Written Opinion Issued in PCT Application No. PCT/US19/013562", dated Apr. 16, 2019, 6 Pages. (MS# 404644-WO-PCT).

"Creative Commons", Retrieved from: https://creativecommons.org/licenses/by/3.0/, Retrieved on Jan. 22, 2018, 1 Page.

"Flaticon", Retrieved from: https://www.flaticon.com/, Retrieved on Jan. 22, 2018, 14 Pages.

"Freepik", Retrieved from: https://www.freepik.com/, Retrieved on Jan. 22, 2018, 18 Pages.

Gutoski, et al., "Hierarchical Deterministic Bitcoin Wallets that Tolerate Key Leakage", In Proceedings of the International Conference on Financial Cryptography and Data Security, Jan. 26, 2015, 9 Pages.

"International Search Report Issued in PCT Application No. PCT/US2019/013561", dated Jul. 3, 2019, 12 Pages. (MS# 403783-WO-PCT).

"Non Final Office Action Issued in U.S. Appl. No. 15/994,337", dated Feb. 3, 2020, 8 Pages. (MS# 404645-US-NP).

"Non Final Office Action Issued in U.S. Appl. No. 15/994,900", dated May 20, 2020, 25 Pages.

Antonopoulos, Andreasm., "Mastering Bitcoin", In Publication of O'Reilly Media, Inc, Dec. 2014, pp. 88-99.

White, Ron, "How Computers Work", In Book of "How Computers Work", Seventh Edition, Published by Que, Oct. 2003, 23 Pages.

* cited by examiner

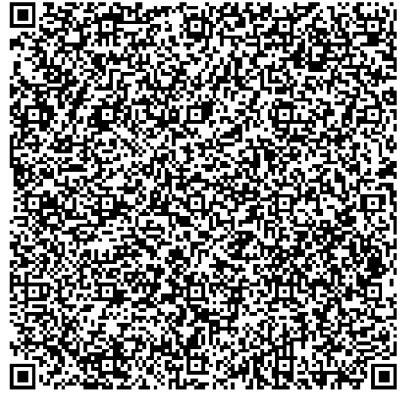

-----BEGIN RSA PRIVATE KEY-----
MIIBOgIBAAJAcynbvbo1OTqsTZEdfTP5POyJ4y6HMsdOVhwivI/842dDPz3pZrCr
XZMyceutF2SdEF8HawFeZAdh+0sfXtAgJQIDAQABAkBKDoDgYP4Y70IeH1N3UBTW
uMVy8li+rqwRc8Ziu7VEBiKWpYoAlnEhzHTzH9zNTUipFco9k7QWyJWcwhHK/ngB
AiEA0H2ehAIet46YKyBSqhBbNpQ8tZxZa42A3coAD1OeJfECIQCNZ/arTrYYyb83
I5jqQthIahDm+W6xdIO1JOdBudhZdQIhALbARgBqJeW0AkJbNNqJN8rhqU1v3Rnf
kUPX2rGUIB2hAiAMYoqsPIycly70OV3vRqOC1Cde04HqcR6rwuuuSgS08QIhAIr4
X9GQW2TnafzfbKLsu9fqZYDIoR3Z+ea8UI3C+gTh
-----END RSA PRIVATE KEY-----

FIG. 3A

-----BEGIN PUBLIC KEY-----
MFswDQYJKoZIhvcNAQEBBQADSgAwRwJAcynbvbo1OTqsTZEdfTP5POyJ4y6HMsdO
Vhwivl/842dDPz3pZrCrXZMyceutF2SdEF8HawFeZAdh+0sfXtAgJQIDAQAB
-----END PUBLIC KEY-----

300B

301B

302B

500

Create New DID
501

ABC Entity
502

Confirm Create New ID
- You are about to create a DID.
-  .  .  .  .  .  .
-  .  .  .  .  .  .
503

Create
504

FIG. 5

DID Document
700

{
 "@context": "https://w3id.org/future-method/v1", — 701
 "id": "did:abcd:123456789abcdefghi", — 702
 "accessControl": [ — 703
   "readPermission": [] — 704
   "writePermission": [] — 705
   ........
 ]
 "publicKey": [ ......... ], — 706
 "signature": [ ......... ], — 707
 "service": [ ......... ], — 708
}

*FIG. 7*

GENERATING AND MANAGING DECENTRALIZED IDENTIFIERS

CROSS-REFERENCE TO RELATED APPLICATIONS

This application claims priority to U.S. Provisional Application Ser. No. 62/620,300, filed on Jan. 22, 2018 and entitled "DECENTRALIZED IDENTITY PLATFORM," and U.S. Provisional Application Ser. No. 62/626,564, filed on Feb. 5, 2018 and entitled "DECENTRALIZED IDENTITY PLATFORM," wherein all of the foregoing are incorporated herein by reference in their entireties.

BACKGROUND

Most of currently used documents or records that prove identity are issued by centralized organizations, such as governments, schools, employers, or other service centers or regulatory organizations. These organizations often maintain every member's identity in a centralized identity management system. A centralized identity management system is a centralized information system used for organizations to manage the issued identities, their authentication credentials, authorizations, roles and privileges. Centralized identity management systems have been deemed as secure since they often use professionally maintained hardware and software. Typically, the identity issuing organization sets the terms and requirements for registering members (e.g., people or groups) with the organization. Finally, when a party needs to verify another party's identity, the verifying party often needs to go through the centralized identity management system to obtain information verifying and/or authenticating the other party's identity.

Decentralized Identifiers (DIDs) are a new type of identifier, which are independent from any centralized registry, identity provider, or certificate authority. Distributed ledger technology (such as blockchain) provides the opportunity for using fully decentralized identifiers. Distributed ledger technology uses globally distributed ledgers to record actions between two or more parties in a verifiable way. Once an action is recorded, the data in the section of ledger cannot be altered retroactively without the alteration of all subsequent sections of ledger, which provides a fairly secure platform. In a broader sense, a DID may further include a DID method specifying how a client may register, replace, rotate, and/or recover a key. The DID method may also set a key expiration date.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

At least some embodiments described here relate to the generation and management of decentralized identifiers of an entity. In accordance with the principles described herein, a decentralized identifier of a particular entity is recorded. Then, upon determining that the particular entity is granting a permission to another entity, the permission is signed based on the recorded decentralized identifier. As one example, the permission may be signed by a private key of the decentralized identifier. In accordance with some embodiments described herein, the permission may be verified upon request by authenticating the signed permission being associated with the recorded decentralized identifier; and authorizing the other entity to act upon the data depending on the authentication. As an example only, the authentication may occur using a public key associated with the recorded decentralized identifier.

The principled described here allow entities to easily and automatically manage multiple decentralized identifiers, which in turn can control how, when and to whom those entities' data is revealed. Entities are freed from ongoing dependency on identity issuing institutions or any centralized authority to verify their own credentials. Entities not only own their own portable, private portfolio of their own records, but also prevent fraud and misrepresentation of official documents while allowing third party entities to quickly verify the authenticity and integrity of records and credentials presented to them. Entities may also define their own permissions under which the shared data can be used by a third-party entity, including but not limited to freedom to use, archive, re-sale, and backup.

Managing decentralized identifiers of entities is different than managing centralized identifiers of entities. Unlike a centralized identifier management system, in which the identity and credential data of entities are often stored on a centralized server, a decentralized identifier management system described herein includes information that is defined by each of the entity describing how to use each of the decentralized identifiers of the entity, including but not limited to cryptographic methods, authentication methods, and service endpoints. Also, unlike a centralized identifier management system, which controls each of entities' records, the decentralized identifier management system cannot reveal any record of an entity without the entity's permission.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 3A illustrates a private key of a decentralized identifier (DID);

FIG. 5 illustrates an example user interface of the system describe herein, which may be interfaced herein to generate a new DID for an entity;

FIG. 7 illustrates an example DID document;

DETAILED DESCRIPTION

Figure 1:
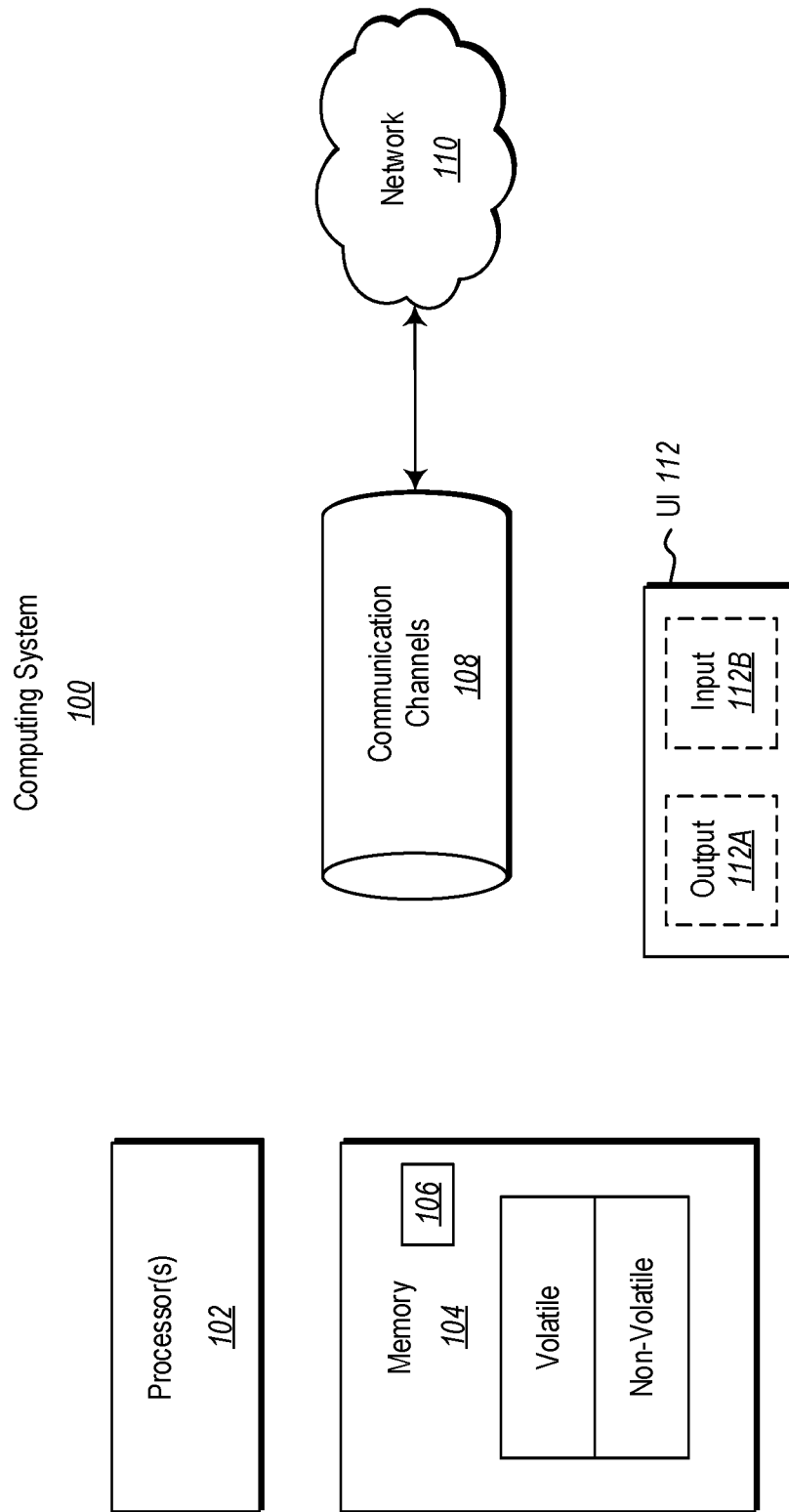
FIG. 1 illustrates an example computer system in which the principle described herein may be employed.

At least some embodiments described here relate to the generation and management of decentralized identifiers of an entity. In accordance with the principles described herein, a decentralized identifier of a particular entity is recorded. Then, upon determining that the particular entity is granting a permission to another entity, the permission is signed based on the recorded decentralized identifier. As one example, the permission may be signed by a private key of the decentralized identifier. In accordance with some embodiments described herein, the permission may be verified upon request by authenticating the signed permission being associated with the recorded decentralized identifier; and authorizing the other entity to act upon the data depending on the authentication. As an example only, the authentication may occur using a public key associated with the recorded decentralized identifier.

The principled described here allow entities to easily and automatically manage multiple decentralized identifiers, which in turn can control how, when and to whom those entities' data is revealed. Entities are freed from ongoing dependency on identity issuing institutions or any centralized authority to verify their own credentials. Entities not only own their own portable, private portfolio of their own records, but also prevent fraud and misrepresentation of official documents while allowing third party entities to quickly verify the authenticity and integrity of records and credentials presented to them. Entities may also define their own permissions under which the shared data can be used by a third-party entity, including but not limited to freedom to use, archive, re-sale, and backup.

Managing decentralized identifiers of entities is different than managing centralized identifiers of entities. Unlike a centralized identifier management system, in which the identity and credential data of entities are often stored on a centralized server, a decentralized identifier management system described herein includes information that is defined by each of the entity describing how to use each of the decentralized identifiers of the entity, including but not limited to cryptographic methods, authentication methods, and service endpoints. Also, unlike a centralized identifier management system, which controls each of entities' records, the decentralized identifier management system cannot reveal any record of an entity without the entity's permission.

Because the principles described herein operate in the context of a computing system, a computing system will be described with respect to FIG. 1. Computing systems are now increasingly taking a wide variety of forms. Computing systems may, for example, be handheld devices, appliances, laptop computers, desktop computers, mainframes, distributed computing systems, datacenters, or even devices that have not conventionally been considered a computing system, such as wearables (e.g., glasses, watches, bands, and so forth). In this description and in the claims, the term "computing system" is defined broadly as including any device or system (or combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

As illustrated in FIG. 1, in its most basic configuration, a computing system 100 typically includes at least one hardware processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

The computing system 100 has thereon multiple structures often referred to as an "executable component". For instance, the memory 104 of the computing system 100 is illustrated as including executable component 106. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods that may be executed on the computing system, whether such an executable component exists in the heap of a computing system, or whether the executable component exists on computer-readable storage media.

In such a case, one of ordinary skill in the art will recognize that the structure of the executable component exists on a computer-readable medium such that, when interpreted by one or more processors of a computing system (e.g., by a processor thread), the computing system is caused to perform a function. Such structure may be computer-readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures that are implemented exclusively or near-exclusively in hardware, such as within a field programmable gate array (FPGA), an application specific integrated circuit (ASIC), or any other specialized circuit. Accordingly, the term "executable component" is a term for a structure that is well understood by those of ordinary skill in the art of computing, whether implemented in software, hardware, or a combination. In this description, the term "component" or "vertex" may also be used. As used in this description and in the case, this term (regardless of whether the term is modified with one or more modifiers) is also intended to be synonymous with the term "executable component" or be specific types of such an "executable component", and thus also have a structure that is well understood by those of ordinary skill in the art of computing.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied on one or more computer-readable media that form a computer program product. An example of such an operation involves the manipulation of data.

The computer-executable instructions (and the manipulated data) may be stored in the memory 104 of the computing system 100. Computing system 100 may also contain communication channels 108 that allow the computing system 100 to communicate with other computing systems over, for example, network 110.

While not all computing systems require a user interface, in some embodiments, the computing system 100 includes a user interface 112 for use in interfacing with a user. The user interface 112 may include output mechanisms 112A as well as input mechanisms 112B. The principles described herein are not limited to the precise output mechanisms 112A or input mechanisms 112B as such will depend on the nature of the device. However, output mechanisms 112A might include, for instance, speakers, displays, tactile output, holograms, virtual reality, and so forth. Examples of input mechanisms 112B might include, for instance, microphones, touchscreens, holograms, virtual reality, cameras, keyboards, mouse or other pointer input, sensors of any type, and so forth.

Embodiments described herein may comprise or utilize a special purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computing system. Computer-readable media that store computer-executable instructions are physical storage media. Computer-readable media that carry computer-executable instructions are transmission media. Thus, by way of example, and not limitation, embodiments can comprise at least two distinctly different kinds of computer-readable media: storage media and transmission media.

Computer-readable storage media include RAM, ROM, EEPROM, CD-ROM or other optical disk storage, magnetic disk storage or other magnetic storage devices, or any other physical and tangible storage medium which can be used to store desired program code means in the form of computer-executable instructions or data structures and which can be accessed by a general purpose or special purpose computing system.

A "network" is defined as one or more data links that enable the transport of electronic data between computing systems and/or components and/or other electronic devices. When information is transferred or provided over a network or another communications connection (either hardwired, wireless, or a combination of hardwired or wireless) to a computing system, the computing system properly views the connection as a transmission medium. Transmissions media can include a network and/or data links which can be used to carry desired program code means in the form of computer-executable instructions or data structures and which can be accessed by a general purpose or special purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface component (e.g., a "NIC"), and then eventually transferred to computing system RAM and/or to less volatile storage media at a computing system. Thus, it should be understood that readable media can be included in computing system components that also (or even primarily) utilize transmission media.

Computer-executable instructions comprise, for example, instructions and data which, when executed at a processor, cause a general purpose computing system, special purpose computing system, or special purpose processing device to perform a certain function or group of functions. Alternatively, or in addition, the computer-executable instructions may configure the computing system to perform a certain function or group of functions. The computer executable instructions may be, for example, binaries or even instructions that undergo some translation (such as compilation) before direct execution by the processors, such as intermediate format instructions such as assembly language, or even source code.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses or watches) and the like. The invention may also be practiced in distributed system environments where local and remote computing systems, which are linked (either by hardwired data links, wireless data links, or by a combination of hardwired and wireless data links) through a network, both perform tasks. In a distributed system environment, program components may be located in both local and remote memory storage devices.

Those skilled in the art will also appreciate that the invention may be practiced in a cloud computing environment, which is supported by one or more datacenters or portions thereof. Cloud computing environments may be distributed, although this is not required. When distributed, cloud computing environments may be distributed internationally within an organization and/or have components possessed across multiple organizations.

In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

For instance, cloud computing is currently employed in the marketplace so as to offer ubiquitous and convenient on-demand access to the shared pool of configurable computing resources. Furthermore, the shared pool of configurable computing resources can be rapidly provisioned via virtualization and released with low management effort or service provider interaction, and then scaled accordingly.

A cloud computing model can be composed of various characteristics such as on-demand, self-service, broad network access, resource pooling, rapid elasticity, measured service, and so forth. A cloud computing model may also come in the form of various application service models such as, for example, Software as a service ("SaaS"), Platform as a service ("PaaS"), and Infrastructure as a service ("IaaS"). The cloud computing model may also be deployed using different deployment models such as private cloud, community cloud, public cloud, hybrid cloud, and so forth. In this description and in the claims, a "cloud computing environment" is an environment in which cloud computing is employed.

Traditionally, identity management systems are often built on centralized authorities including, but not limited to, employer directories, government organizations, email services, certificate authorities, and/or domain name registries. On the other hand, decentralized identities are identities upon which authentication may be performed in a decentralized system. Examples of such decentralized systems include a distributed ledger in which the decentralized identity may be recorded. Another example of a decentralized system includes a peer-to-peer system in which authentication is performed within the peer-to-peer system, allowing computing systems within peer-to-peer system to then take action based on the authentication.

Figure 2:
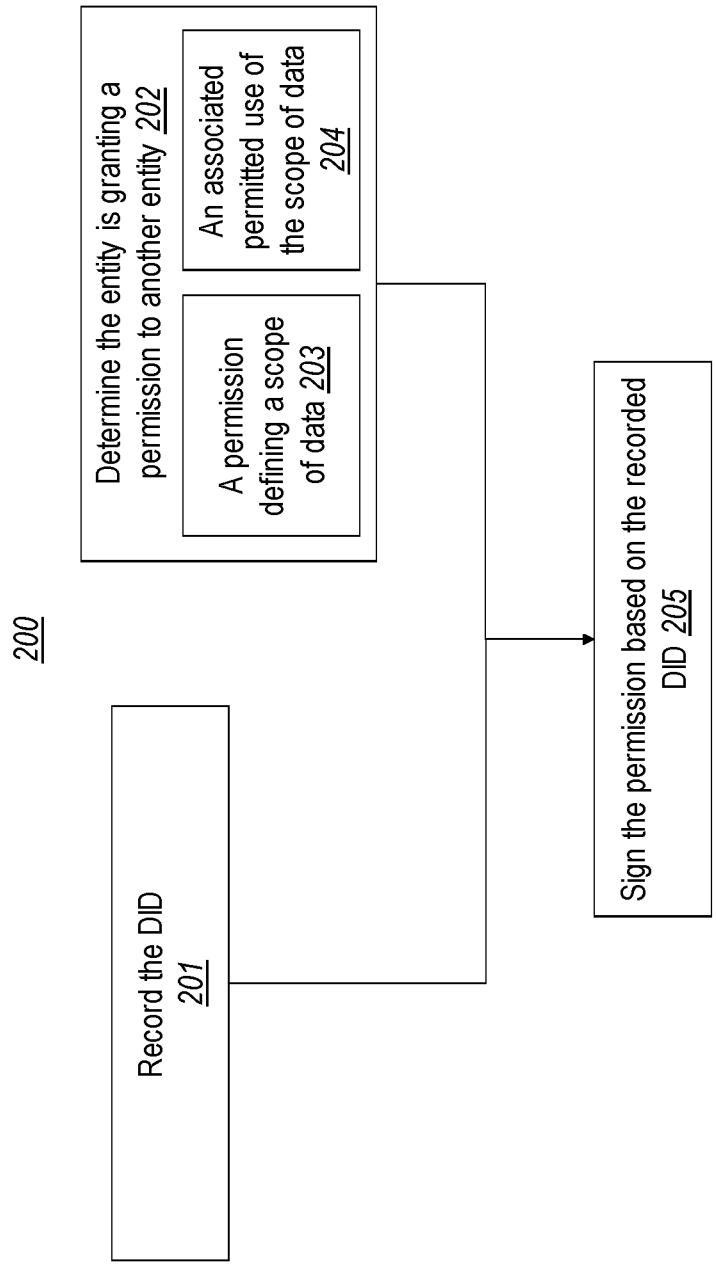
FIG. 2 illustrates a flowchart of a method for managing decentralized identifiers of an entity.

A computing system may be used to generate and/or manage centralized identifiers for entities. Such a computing system may be, for instance, the computing system 100 that is described above with respect to FIG. 1, and may be hereinafter be referred to as the "DID management system" or simply the "system". FIG. 2 illustrates a flowchart of a method 200 for generating and managing decentralized identifiers of an entity. The method includes recording a decentralized identifier of a particular entity (act 201). The principles described herein are not limited to what that particular entity is, or what type of entity that particular entity. For instance, a particular entity may be a user, an organization, a product, a logical component, a building, or any other entity for which authentication may be of benefit.

When the decentralized system is a peer-to-peer system, the recording (of act 201) may encompass simply representing the decentralized identifier in a storage and/or memory of whichever peer computing system created the decentralized identifier. When the decentralized system is a distributed ledger, the recording may be performed directly to the distributed ledger. But even prior to recording the decentralized identifier on the distributed ledger, the decentralized identifier will first be recorded by being represented within the storage and/or memory of the computing system that generated the decentralized identifier. Once the decentralized identifier is recorded, this represents the creation of the decentralized identifier within the decentralized system. Thereafter, when actions are taken with respect to that decentralized identifier, those actions may be similarly recorded and associated with the decentralized identifier.

The method 200 also includes determining that the entity corresponding to the decentralized identifier is granting a permission to another entity (act 202). The act 202 is shown in parallel with the act 201 to represent that there need not be any no temporal dependency between these two acts. The determination that a permission is to be granted from a first entity to a second entity (act 202) may happen before, during, and/or after the decentralized identifier is created and recorded (act 201). However, in many embodiments, the decentralized identifier may be created well in advance of the granting of permissions. In fact, numerous permission may be granted after the decentralized identifier is created and recorded.

One it is determined that a permission is to be granted (act 202), then assuming there is already a decentralized identifier recorded (act 201), the permission is signed based on the recorded decentralized identifier (act 205). A decentralized identifier may include a private key and a public key. The private key is used to sign the permission granted to the other entity. The public key thereafter may be used to authenticate the signed permission. The principles described herein are not limited to the format of the private key or the public key. As examples, the private key and public key might be raw binary format, hexadecimal format, and a Quick Response (QR) code.

The permission granted to another entity may include a permission defining a scope of data (203), and an associated permitted use of the scope of data (204). For instance, the scope of data might be a particular file, a particular field, a particular database, or particular data blob, combinations or multiples thereof, and so forth. The associated permitted use of the scope of data (204) might include permissions to read, write, edit, use, link, delete, update, and forth, of data within a particular scope. Also, permitted uses might actually be defined by a complex set of terms of use, such as a licensing agreement. The permitted use might include a sub-licensing of the user of the data. Currently, many web service providers do not enable a user to define their own terms of use of their own data once such data is posted online. In some embodiments of principles described herein, the system allows entities to freely define their own terms of use and associate them with the decentralized identifier. In some embodiments, the system may provide several pre-constructed terms that a user may choose from.

Figure 3B:
FIG. 3B illustrates a public key of a DID corresponding to the private key in FIG. 3A.

FIG. 3A shows an example of a private key that is represented in two different formats. The private key 301A is in hexadecimal format with additional header and footer lines. The private key 302A represented the exact same private key, but in a different format—a QR format. Likewise, FIG. 3B shows an example of a public key that is represented in two different formats. The public key 301B is in hexadecimal format with additional header and footer lines. The public key 302B represented the exact same public key, but in the QR format. The hexadecimal format allows the keys to be easily transmitted as part of electronic communications. QR formats (or any bar code format) is beneficial in cases in which the key is to be scanned for quick input.

Figure 4:
FIG. 4 illustrates an example user interface of the system describe herein, which may be interfaced with to allow an entity to add an existing DID to the system.

FIG. 4 shows an example of a user interface 400 in which an entity can scan a QR code of an existing decentralized identifier when recording that decentralized identifier to the system. The interface 400 includes a description portion 401 that describes the purpose of the remainder of the interface. In this case, the description portion 401 indicates that the interface 400 is for adding accounts (i.e., adding existing decentralized identifiers). The instruction potion 402 of the user interface 400 instructs users to scan a QR code by moving the QR code into the range of the rectangular camera area 403. If the user device does not have a camera, or the user does not have his/her decentralized identifier in QR code format, the user still can enter the decentralized identifier manually by clicking the link "Or enter code manually" 404 at the bottom of the interface 400.

Alternatively or in addition, the user may choose to create a new decentralized identifier. FIG. 5 shows an example of user interface 500 for creating a new decentralized identifier. The interface 500 includes a description potion 501 that describes the purpose of the remainder of the interface 500 is being for creating a new decentralized identifier. A human-readable identity portion 502 represents a human-readable identity of the user, which in the case is the fictional "ABC Entity". The instruction portion 503 instructs the user as to what will happen if the user selects the "Create" control at the bottom of the interface 500. After the user clicks the button "create" 504, a new decentralized identifier will be generated for the user, ABC Entity 502.

The process of generating a new decentralized identifier may include first generating a private key, and thereafter generating a public key from that private key using a one-way cryptographic function. The one-way cryptographic function is practically irreversible, meaning that it is easy to calculate in one direction (e.g., the public key from the private key) and infeasible to calculate in the opposite direction (e.g., the private key from the public key). The one-way cryptography enables encryption and the generation of digital signatures. The private key may be used to generate signatures on messages or actions taken with respect to a decentralized identifier. These signatures can be validated using the public key without revealing the private key.

Figure 6:
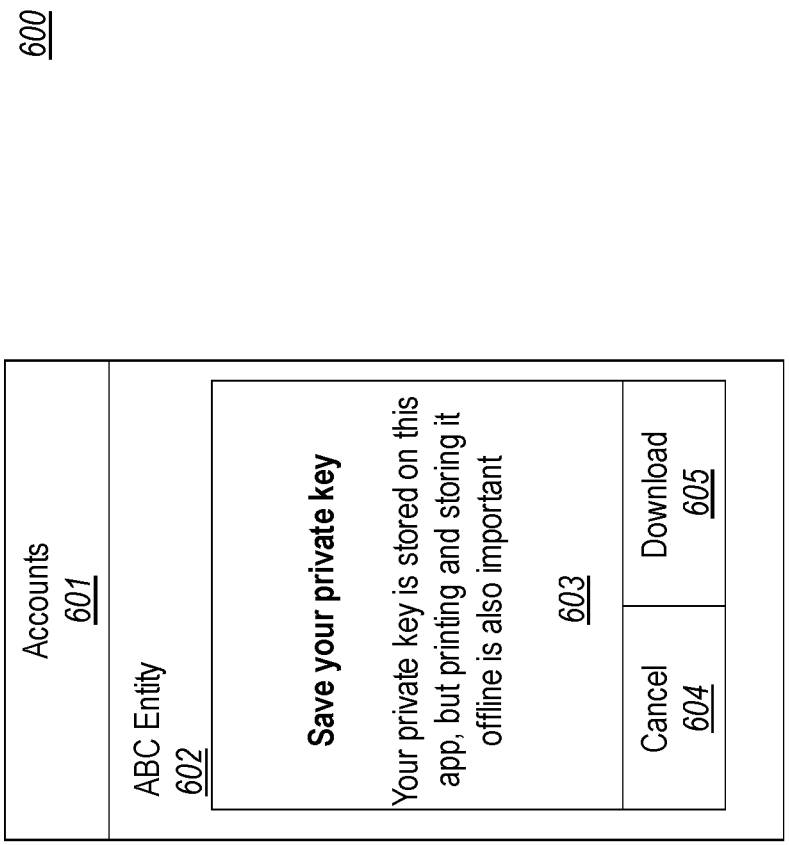
FIG. 6 illustrates an example user interface of the system described herein, which may be interfaced with to store a private key of an entity offline.

To help entities to securely store and/or backup their private keys, the system may store the private key for the entity. At the same time, the system may also encourage the entity to store the private key offline (e.g., print it out on paper or store it on an external storage media (e.g., a USB drive, CD, etc.)). FIG. 6 shows an example of a user interface 600 that allows users to download private keys from the system, and thereafter print the private keys and/or store the private keys offline.

At the top of the user interface, there is description portion 601, which indicates that this is a general account user interface. The human-readable identity portion 602 again shows the human-readable identity of the user (which as a reminder is the fictional "ABC Entity"). An instruction portion 603 prompts the user to download the private key, so that the private key can be printed or stored offline. At the bottom of the instruction portion 603, the user can click the "download" 605 button to complete downloading the private key, or click the "cancel" 604 button to cancel the download or exit the interface 600.

Furthermore, the system generates private keys for entities securely and randomly, such that the private keys generated are not predictable, repeatable, or guessable by a third party. This may accomplished by initiating a random process using a human source of randomness. For example, a user may be asked to randomly move his/her mouse within a pre-determined area for a few seconds. A pseudo-random number generator may also be used with perhaps some secret known only to the user.

The length of the private key is not absolutely critical, except to say that the longer the key, the more secure that key is. The format of the key may be specified in the decentralized identifier method of each particular decentralized system. These decentralized identifier methods should be published and/or registered as standards. For instance, in Bitcoin, a private key is a 256-bit number, i.e., 32 bytes, which may be represented in 64 digit hexadecimal form.

As explained earlier, the private keys should (and perhaps must) remain secret, while it is also important to have the private keys available. In addition to encouraging users to backup their private keys on paper or on external storage media, such as a USB flash drive, the system may also encrypt private keys and store the encrypted private keys for the user as a backup. The principles described are not limited to any particular encryption method used to encrypt the private keys. As examples only, a BIP-38 encryption scheme may be used to encrypt private keys. A BIP-38 encryption scheme may take a long password (usually composed of several words or a complex string of alphanumeric characters) chosen by the user to encrypt a private key. When the longer password chosen by the user is a strong password, the security of backed-up private keys is further increased. Furthermore, the encrypted private key may be also stored on paper, on an external storage media (e.g., a CD, a USB drive), in cloud, and/or in the decentralized identifier management system.

In some embodiment, the decentralized identifier further includes a human-readable identifier. Since the key pair of the decentralized identifier is often long and hard to remember, the system may allow a user to choose a unique human-readable identifier associated with the decentralized identifier. The human-readable identifier may be (but not limited to) a word or a phrase that is shorter than the public key, easier to remember, and still a unique ID. The human-readable identifier may also be an image, or photo.

Generally, a decentralized identifier is merely an identifier, similar to a driver's license number. By itself, that identifier merely identifies, and itself might have no other meaning. However, the decentralized identifier may point to other information or data of the entity that owns the decentralized identifier. In one embodiment, the information and/or data of the entity associated with decentralized identifiers are stored in a document called decentralized identifier document (herein after referred to as "DID document"). The system stores the DID document in a storage media (herein after called ID hub). As an example, the DID document may store the human-readable identifier mentioned above. The DID documents of the entity may be stored on the device of the entity. They may also be stored in a cloud. The cloud storage may be provided by the system. The storage of the DID documents may further be encrypted and/or backed up.

In some embodiments, the DID documents are stored in the JavaScript Object Notation-Linked Data (JSON-LD) format. FIG. 7 shows an example of a DID document using pseudocode. In a JSON-LD file, the first line shows the "@context" property 701, which defines the terms used in the rest of the file. It may include inline text enclosed in brackets "{ }" that defines the schema, or include a Uniform Resource Locator (URL) that links to a file that defines the schema. A DID document is identified by a decentralized identifier (which sometimes is referred to as a "DID" in the art) that is associated with the DID document. To link the associated decentralized identifier with the DID document, the DID document may include an identifier property 702 that includes the value of the decentralized identifier associated with the DID document. For example, the key used for this identifier property may be "id". The value of the key "id" should include a method (referred to herein as a "DID method") of the decentralized system and a decentralized identifier used in the corresponding decentralized platform.

A DID method is a method used in each decentralized service platform to govern the use of decentralized identifiers of each entity. For instance, each of the DID methods may include the format of decentralized identifiers that may be used in the decentralized service platform, one or more methods for recording a decentralized identifier of an entity in an action, one or more methods for granting a permission from one entity to another entity, one or more methods for digitally signing a permission, one or more methods for authenticating a permission, one or more methods for encrypting and/or decrypting messages recorded in the actions, and so forth. Each decentralized service platform specifies at least one DID method. Each of these DID methods may be specified and registered in a registry (herein after referred to as "DID method registry").

Once the DID method is known, an action associated with a given decentralized identifier can be resolved. Resolving an action involves extracting a decentralized identifier for that action, and retrieving the DID document corresponding to the extracted decentralized identifier from the DID management system. Resolving may also include extracting a public key associated with the decentralized identifier, authenticating digital signature(s) included in the action in the distributed ledger, reading and interpreting the DID document that may include personal information related to the decentralized identifier and/or permissions granted by the decentralized identifier, and in the case a permission is granted in the DID document, granting the permission based on the retrieved DID document, and so forth.

Each of the DID methods registered in the DID method registry may be identified with the key "did:" plus a DID method identifier. For example, if the DID method is used for bitcoin, the DID method may be identified as "did:btcr"; and if the DID method is used for Sovrin, the DID method may be identified as "did:sov". Entities can also define its own DID methods. As long as the defined DID methods are registered with the DID method registry, the DID management system is capable of resolve the decentralized identifiers under these DID methods. For example, Ethereum includes several different DID methods that are generated by different entities, including "did: cnsnt", "did: erc725", "did: uport", and "did: dom".

The DID management system may host the DID method registry. Alternatively, the DID management system maintain a copy of the DID registry that is hosted by another entity, or be configured to retrieve each of the registered DID methods directly from a DID registry that is hosted by another entity.

As illustrated in FIG. 7, The first portion of the decentralized identifier 702 is "did:abcd". The letters "abcd" represent the DID method recorded in the DID method registry. As an example, the "abcd" DID method is the particular method used in the "abcd" decentralized service platform. Since the computing system is capable of retrieving each of the DID methods, the DID management system may resolve the decentralized identifier based on the retrieved "abcd" DID method.

In addition to the "id" property, the DID document may also include "accessControl" key 703, "publicKey" key 706, "signature" key 707 and "service" key 708. The "accessControl" kaye may define multiple permissions granted to another entity, including, but not limited to, "readPermission" 704 and "writePermission" 705. The "signature" 707 key may include a signature signed by the entity's private key to authenticating the decentralized identifier and the permission granted. The "publicKey" key includes the public key of the decentralized identifier, which may be used to authenticate the entity's signature. The signature may include one or more other entities' public key or decentralized identifier, such that only the included entities are authorized to access the first entity's particular set of data.

The "service" key may further include an authentication service endpoint. The value of the service key may be a URL linked to the authentication service endpoint provider. The service endpoint provider would be responsible for supporting the authentication protocols. The system may include its own service endpoint providing authentication services. The service endpoint provider may also be a third party, and the system implements APIs to communicate with the third-party service endpoint to obtain the authentication results.

When an entity completes an action on a decentralized system, the public key of the associated decentralized identifier and/or additional information related to the decentralized identifier may be recorded with the action into the distributed ledger.

However, perhaps not all the properties recorded in the DID documents should be recorded on the distributed ledger. Some distributed ledgers may have a size limit for each action record. Recording a large amount of data included in DID document to each of the action records in the distributed ledgers may exceed the size limit of the ledger. Also, even if the action record does not exceed the limit, larger action records could enlarge the distributed ledger quickly and consume storage and computation energy. As long as the information included in the action record (recorded in the distributed ledger) links the action to a particular decentralized identifier and the DID document, it is sufficient for other entities to verify the identity associated with the action and authenticate the action through the DID management system. Furthermore, perhaps personally-identifiable information contained in the DID document should be kept off the distributed ledger for privacy and security reasons. It is more secure to exchange personally-identifiable information on a private and peer-to-peer basis using communication channels identified and secured by key descriptions in the DID documents.

Since the DID documents are generated and stored in the DID management system, instead of the distributed ledger, entities may amend the DID document any time they wish. For example, an action recorded on the public ledger may include a decentralized identifier of "did:abcd: 123456789abcdefghi". Referring back to FIG. 7, this decentralized identifier is associated with the DID document 700. An entity that wants to verify the action may obtain the DID document 700 through the DID management system and use the DID management system to verify and/or authenticate the action.

What is included in the DID document may be changed by the entity at any time. For instance, the entity may change the property value of "accessControl" 703 from write permission to read permission, or the entity may revoke any access completely. After the permission is changed or revoked, when another entity tries to obtain the entity identity of the same action that is recorded in the distributed ledger, the other entity will see the updated DID document with the changed or revoked permissions. The second entity may be able to view personal information of the first entity under permission granted in the previous DID document, but may not be able to view such personal information after the DID document is modified.

Each entity may have multiple decentralized identifiers. Each of these DIDs may represent a different persona of the entity or serve a different purpose. For instance, some of them may be pseudo anonymous. For instance, a user may include a pen name in the DID document when identifying him/her as a writer posting articles on a blog. As another example, some personas may be fully anonymous. For instance, a user may only want to disclose his/her job title or other background data (e.g., a school teacher, an FBI agent, an adult older than 21 years old, etc.) but not his/her name in the DID document. Some of the personas may be specific to who you are as an individual (e.g., a user may include information identifying him/her as a volunteer for a particular charity organization, an employee of a particular corporation, an award winner of a particular award, and so forth, in the DID document).

Figure 8:
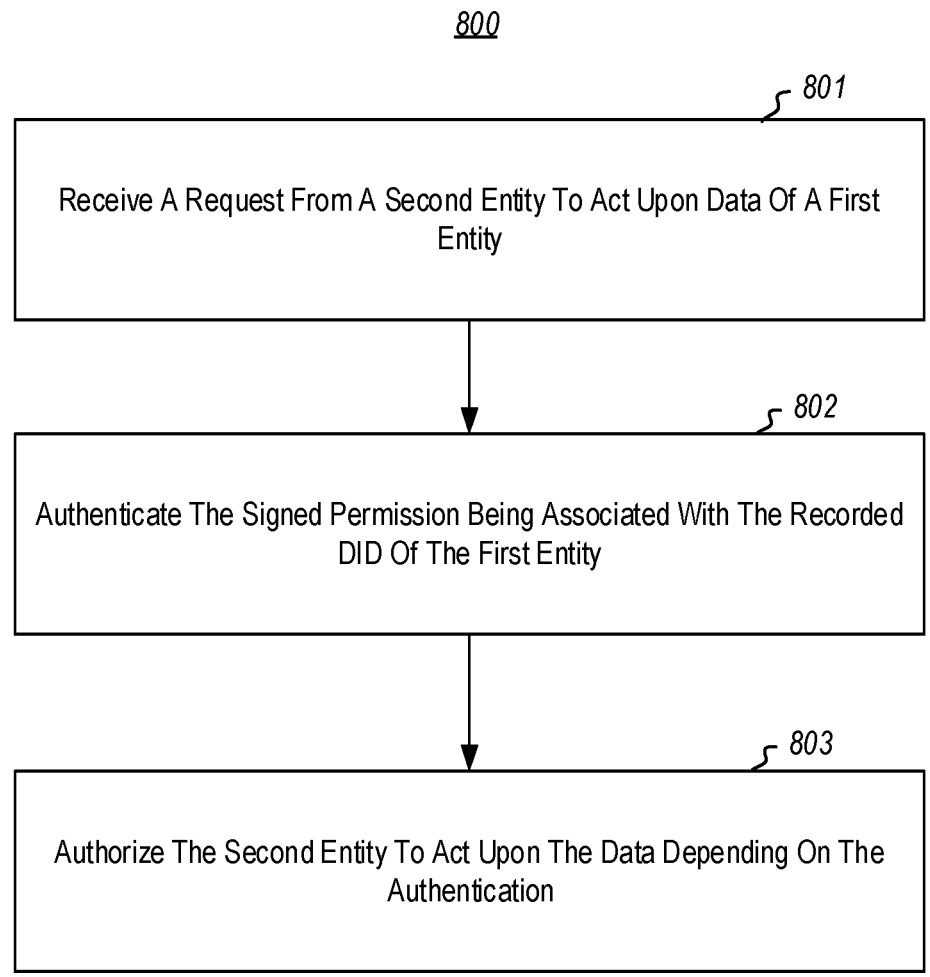
FIG. 8 illustrates a flowchart of the method for allowing a second entity to authenticate a signed permission associated with a DID of a first entity.

Referring to FIG. 8, the method 800 described herein may further include receiving a request from another entity to act upon data (act 801). In response to the request, the system may authenticate the signed permission being associated with the recorded decentralized identifier (act 801). Referring back to FIGS. 3A and 3B, the authentication may be performed using the public key of the entity. After the signed permission is authenticated, the system may authorize the other entity to act upon the data depending on the authenticated permission (act 803).

Figure 9:
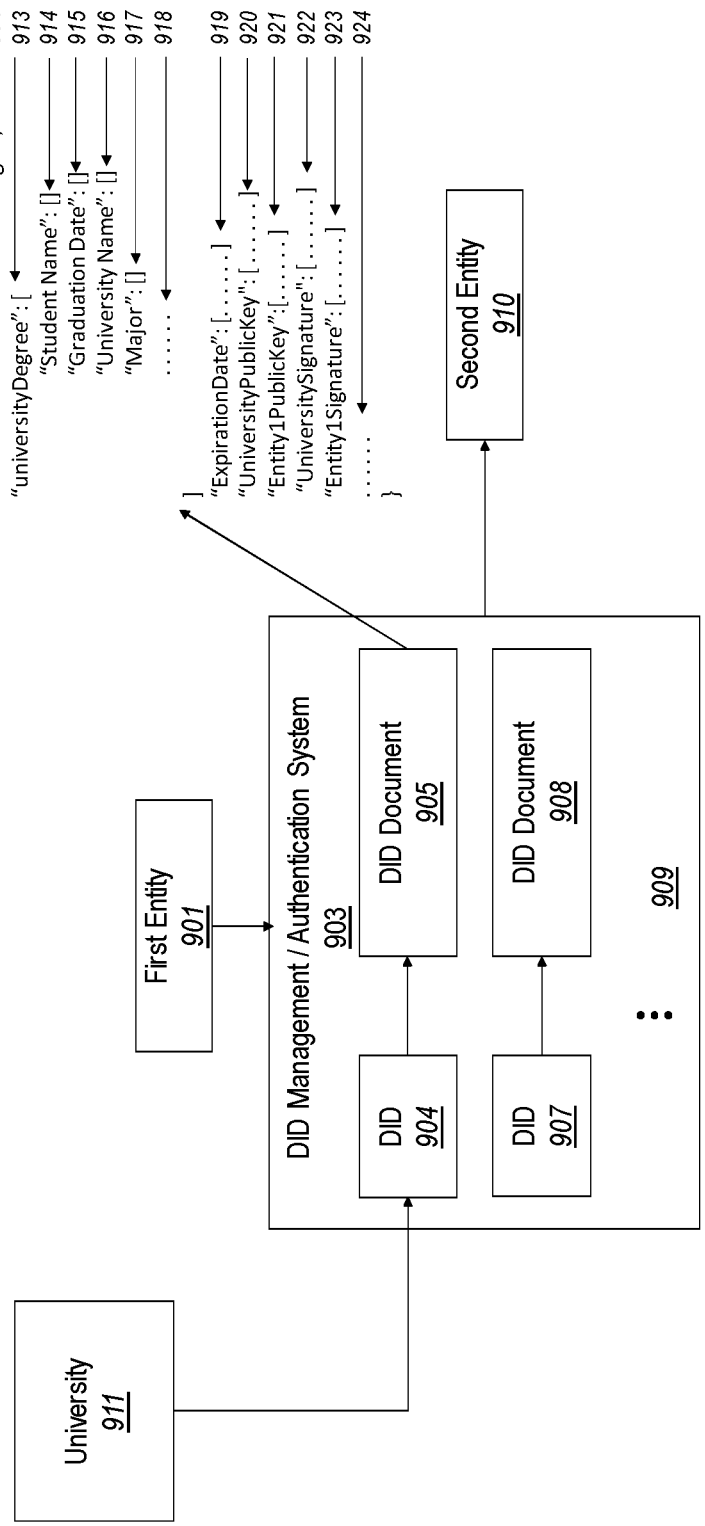
FIG. 9 illustrates an example implementation of the method described herein for allowing a second entity to verify a credential of a first entity.

For example, referring to FIG. 9, a first entity 902 may authorize a second entity 910 to verify a credential of the first entity 901. A credential may be any information that is associated with an entity's background. For instance, a credential may be (but not limited to) a qualification, an achievement, a legal name, a government ID, a payment provider, a home address, a university degree, a work history, or any other information about an entity's background.

As illustrated in FIG. 9, the DID document 905 includes a DID 904 and the credential type of "universityDegree" 913. The DID document 905 allows the second entity to verify the "universityDegree" credential 913. The DID document 905 may further define how much information related to the "universityDegree" credential that is allowed to be disclosed and verified by the second entity 910. For example, the "universityDegree" credential 913 may further include one or more claims, including (but not limited to) student name 914, graduation date 915, university name 916, and major 917. The ellipsis 918 represents that the first entity may allow the "universityDegree" credential to include more or less information than that is illustrated in FIG. 9. The first entity 901 may also include an expiration date 919 in the DID document, thus, the second entity may only verify the credential 913 before the expiration date 919.

Also, the first entity may include a digital signature 920 signed by the university 911 to the credential 913 and the university's public key 920 in the DID document 905. The university's public key 920 may be an URL that is linked to the university's public key stored on the university's website, or a Certification Authority service site. Of course, when the university 911 signs the first entity's degree credential, it does a number of verifications on the first entity 901, including credits earned for particular major, credits earned for required core courses, total credits earned, and grade points, and so forth.

Finally, the first entity 901 may further sign the credential issued by the university 911 using his/her own private key, and include the signature 923 in the DID document 905. The ellipsis 924 represents that the DID document illustrated in FIG. 9 is merely an example. There may be more or less information included in a DID document.

The first entity 901 may send his/her decentralized identifier 904 to the second entity allowing the second entity to obtain the DID document 905 and verify his/her university degree credential 913 through the DID management system. The DID management system may verify the first entity 901's signature 922 to ensure that the first entity 901 has authorized the second entity 910 to verify the university degree credential 913. Then, the DID management system may further communicate with the university 911's credential system to authenticate the university's signature 922 and verify the university degree credential 913 of the first entity 901.

As an example, the first entity 901 may be an individual looking for a job. The second entity 910 may be an online professional directory, a recruiting web service or a potential employer. Traditionally, if the first entity 901 were to apply for a job, he/she is often required to submit a copy of his/her university diploma or transcript to the recruiting service or the potential employer 910, and the recruiting service or the potential employer 910 generally has no way to verify or authenticate the diploma or transcript without personally contacting the university 911.

Here, when the first entity 901 is applying for a new job, the second entity 910 may indicate that a university degree is required to complete the job application. Accordingly, the first entity 901 may allow the DID management system 903 to generate a new decentralized identifier 904 and a new DID document 905 associated with the new decentralized identifier just for authorizing the second entity 910 to verify his/her university degree. Then, the DID management system 903 may send the newly generated decentralized identifier 904 to the second entity.

This action may be recorded in a distributed ledger of the recruiting service, the university's credential verification system, and/or an internal distributed ledger of the employer. Alternatively, this action may merely be a peer-to-peer action among the user, the employer, and the university. The peer-to-peer action may be recorded or not recorded in one or more public or private distributed ledgers or in a private or public centralized record keeping service. In particular, the peer-to-peer action may be recorded as each of the parties' private record or centralized storage, and not recorded in any distributed ledgers.

Accordingly, the DID management system is not only capable of managing DIDs that are recorded with actions in decentralized ledgers, but also capable of managing DIDs that are used for merely peer-to-peer communications. In any case, the DID management system allows a first entity to fully control its own information and grant or revoke permissions that allow other entities to access any particular portion of information related to the first entity.

The DID management system may further manage the expiration time set by the first entity 901. Different methods or embodiments may be implemented to achieve this goal. For example, when the expiration time is reached, the DID management system may update the DID document 905 revoking the verification permission in the DID document 906 or removing the credential information from the DID document 906 completely. Alternatively, the DID management system may also access the time of the second entity's request and compare the request time with the expiration time set in the DID document 905.

Figure 10:
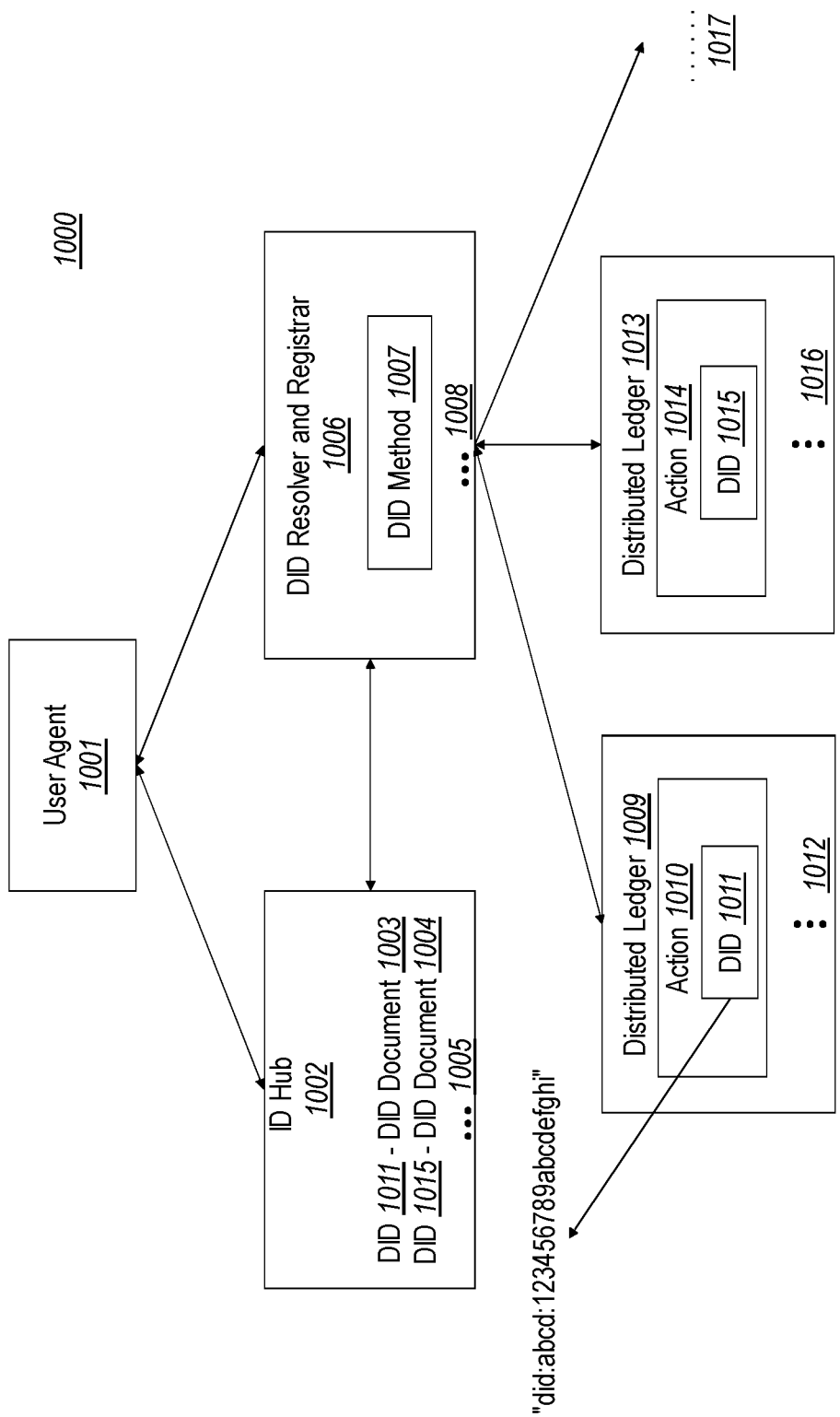
FIG. 10 illustrates an example architecture used to implement the method described herein.

FIG. 10 illustrates an example architecture of the DID management system 1000. The DID management system 1000 may include a user agent 1001, an ID hub 1002 and a DID resolver and registrar 1006.

The user agent 1001 may be implemented on user devices that includes user interfaces and APIs allowing entities to communicate with other DID management systems and/or distributed service platforms. The ID hub 1002 is referred to one or more storage storing DID documents for entities. As illustrated, the ID hub 1002 may include multiple DID documents 1003, 1004 and 1005 of entities. The ellipsis 1005 represents that the number of DID documents 1003-1005 included in the ID hub 1002 may be any natural number. The ID hub may be (but not limited to) an internal/external storage implemented on the user devices and/or a cloud storage.

The DID resolver and registrar 1006 records newly generated DIDs and existing DIDs input by users. The DID resolver and registrar 1006 also resolves DIDs retrieved from recorded actions. The DID resolver and registrar 1006 includes information of multiple DID methods 1007 and 1008, each of which is defined for a different decentralized service platform. The ellipsis 1008 represents that the number of DID methods included in the DID resolver and registrar 1006 may be any natural number.

The DID resolver and registrar 1006 can generate and resolve DIDs that are recorded on different decentralized ledgers 1009, 1013 and 1017 for different decentralized service platforms that are included in the DID resolver and registrar 1006. For example, the distributed ledger 1009 may represent bitcoin service platform, and the distributed ledger 1010 may represent Veres One service platform. The ellipsis 1017 represents that there may be any natural number of decentralized ledgers, on which the information may be retrieved and resolved by the DID resolver and registrar 1006.

Each of the distributed ledgers 1009, 1013 and 1017 may include records of actions for each of their service platforms. For example, the distributed ledger 1009 may include actions 1010 and 1012, and the distributed ledger 1013 may include actions 1014 and 1016. The ellipses 1012 and 1016 represent that the number of actions included in the distributed ledgers 1009 and 1013 may be any natural number. Each of the recorded actions 1010 and 1014 may include a DID 1011 or 1015. The decentralized identifiers 1010 and 1014 included in the recorded actions are identifiers of DID documents. In some embodiment, the decentralized identifiers 1010 and 1014 may include the DID method and a unique ID number.

For example, as illustrated in FIG. 10, the value of decentralized identifier 1011 is "did:abcd:123456789abcdefghi". The first portion of the value of the decentralized identifier is "abcd", representing "abcd" DID method is used in the actions 1010 of the particular decentralized platform. The second portion of the value of the decentralized identifier is a unique number "123456789abcdefghi." When the user agent 1001 indicates that the actions 1010 is to be verified. In response to the indication, the DID resolver and registrar 1006 retrieves the decentralized identifier "abcd:123456789abcdefghi" 1011 from the actions 1010. Then, the DID resolver and registrar 1006 accesses the ID hub 1002 and find the DID document 1003 that is associated with the decentralized identifier 1011 from the ID hub 1002. Finally, the DID resolver and registrar 1006 resolves the decentralized identifier 1011 by verifying the permissions granted and/or signatures signed in the DID document 1003, and granting the permissions to the user agent 1001.

For example, referring back to FIG. 7, the DID document associated with the DID "abcd:123456789abcdefghi" would be the DID document 700. Based on the first portion of the decentralized identifier, the DID resolver and registrar 106 understands that this decentralized identifier is used in the "abcd" platform. Accordingly, the DID resolver and registrar 106 retrieves the "abcd" DID method from the system. Based on the "abcd" DID method and the DID document 700 retrieved, the DID resolver and registrar 1006 may further authenticate the signature 707 and grant the permission(s) 703 contained in the DID document 800.

The principles described herein allows an entity to securely and easily manage its own identities and/or information and data associated with its identities. A first entity is allowed to define its own permissions granted to any other entities for accessing data owned by the first entity. And, the first entity can also revoke previously granted permissions at any time as it wishes. Furthermore, the principles described herein also allows an entity to securely and easily verify and authenticate anther entity's identity and/or information and data associated with the other entity's identity. The principles described herein may be implemented to work with not only decentralized ledger platforms, but also peer-to-peer secured communication systems and/or centralized services.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computing system comprising:
   one or more processors; and
   one or more hardware storage devices having thereon computer-executable instructions that are structured such that, when executed by the one or more processors, cause the computing system to generate and manage decentralized identifiers of an entity by causing the computing system to perform operations comprising:
   recording a decentralized identifier of a first entity that points to a decentralized identifier document, the decentralized identifier document being associated with the first entity and comprising data associated with the first entity including a signature of a separate entity, the signature certifying a transaction between the first entity and the separate entity;
   determining that the first entity is granting a permission to a second entity to verify the transaction between the first entity and the separate entity, the permission defining a scope of data associated with the first entity and an associated permitted use of that scope of data;
   signing the permission using a private key of the recorded decentralized identifier;
   receiving a request from the second entity to act upon the data associated with the first entity to access the signature of the separate entity to verify the transaction between the first entity and the separate entity;
   authenticating the signed permission using a public key of the recorded decentralized identifier; and
   depending on the authentication, authorizing the second entity to act upon the data to access the signature of the separate entity to verify the transaction between the first entity and the separate entity.

2. The computing system of claim 1, wherein the private key is stored off-line.

3. The computing system in accordance with claim 1, wherein the permission is changed in response to the first entity.

4. The computing system in accordance with claim 1, wherein the granted permission is revoked in response to the first entity.

5. The computing system of claim 1, wherein the operations further comprise:
   generating a new decentralized identifier;
   associating the new decentralized identifier with the first entity; and
   recording the new decentralized identifier.

6. The computing system of claim 1, wherein the permission defining a scope of data comprises a permission to read data associated with the particular entity.

7. The computing system of claim 1, wherein the second entity is associated with another decentralized identifier.

8. The computing system of claim 1, wherein the decentralized identifier is recorded in a distributed ledger.

9. The computing system of claim 1, wherein the associated permitted use of the scope of data is specified by the first entity.

10. The computing system of claim 1, wherein the associated permitted use of the scope of data includes two or more predetermined use options that are provided to a permissions application for the first entity to choose from.

11. The computing system of claim 1, wherein the decentralized identifier comprises a human-readable identifier.

12. The computing system of claim 11, wherein the human-readable identifier comprises a photo.

13. The computing system of claim 1, wherein the decentralized identifier is recorded by being stored on a device of the first entity.

14. The computing system of claim 1, wherein the decentralized identifier is recorded by being stored in a cloud store.

15. The computing system of claim 1, wherein the recording of the decentralized identifier is encrypted.

16. The computing system in accordance with claim 1, wherein determining that the first entity is granting a permission to a second entity to verify the transaction between the first entity and the separate entity includes recording a second decentralized identifier of the first entity that points to a second decentralized identifier document, the second decentralized identifier document being associated with the first entity and comprising a permission entry that grants permission to the second entity to access the signature of the separate entity.

17. The computing system in accordance with claim 16, wherein the second decentralized identifier document also includes the signature of the separate entity, and wherein authorizing the second entity to access the signature of the separate entity includes retrieving the second decentralized identifier document.

18. A method for generating and managing decentralized identifiers of an entity, the method comprising:
   recording a decentralized identifier of a first entity that points to a decentralized identifier document, the decentralized identifier document being associated with the first entity and comprising data associated with the first entity including a signature of a separate entity, the signature certifying a transaction between the first entity and the separate entity;
   determining that the first entity is granting a permission to a second entity to verify the transaction between the first entity and the separate entity, the permission defining a scope of data associated with the first entity and an associated permitted use of that scope of data;
   signing the permission using a private key of the recorded decentralized identifier;
   receiving a request from the second entity to act upon the data associated with the first entity to access the signature of the separate entity to verify the transaction between the first entity and the separate entity;
   authenticating the signed permission using a public key of the recorded decentralized identifier; and
   depending on the authentication, authorizing the second entity to act upon the data to access the signature of the separate entity to verify the transaction between the first entity and the separate entity.

19. A computer program product comprising one or more hardware storage devices having thereon computer-executable instructions that are structured such that, when executed by one or more processors of a computing system, cause the computing system to generate and manage decentralized identifiers of an entity by causing the computing system to perform operations comprising:
   recording a decentralized identifier of a first entity that points to a decentralized identifier document, the decentralized identifier document being associated with the first entity and comprising data associated with the first entity including a signature of a separate entity, the signature certifying a transaction between the first entity and the separate entity;
   determining that the first entity is granting a permission to a second entity to verify the transaction between the first entity and the separate entity, the permission defining a scope of data associated with the first entity and an associated permitted use of that scope of data;
   signing the permission using a private key of the recorded decentralized identifier;
   receiving a request from the second entity to act upon the data associated with the first entity to access the signature of the separate entity to verify the transaction between the first entity and the separate entity;
   authenticating the signed permission using a public key of the recorded decentralized identifier; and
   depending on the authentication, authorizing the second entity to act upon the data to access the signature of the separate entity to verify the transaction between the first entity and the separate entity.

* * * * *